United States Patent Office 3,445,946
Patented May 27, 1969

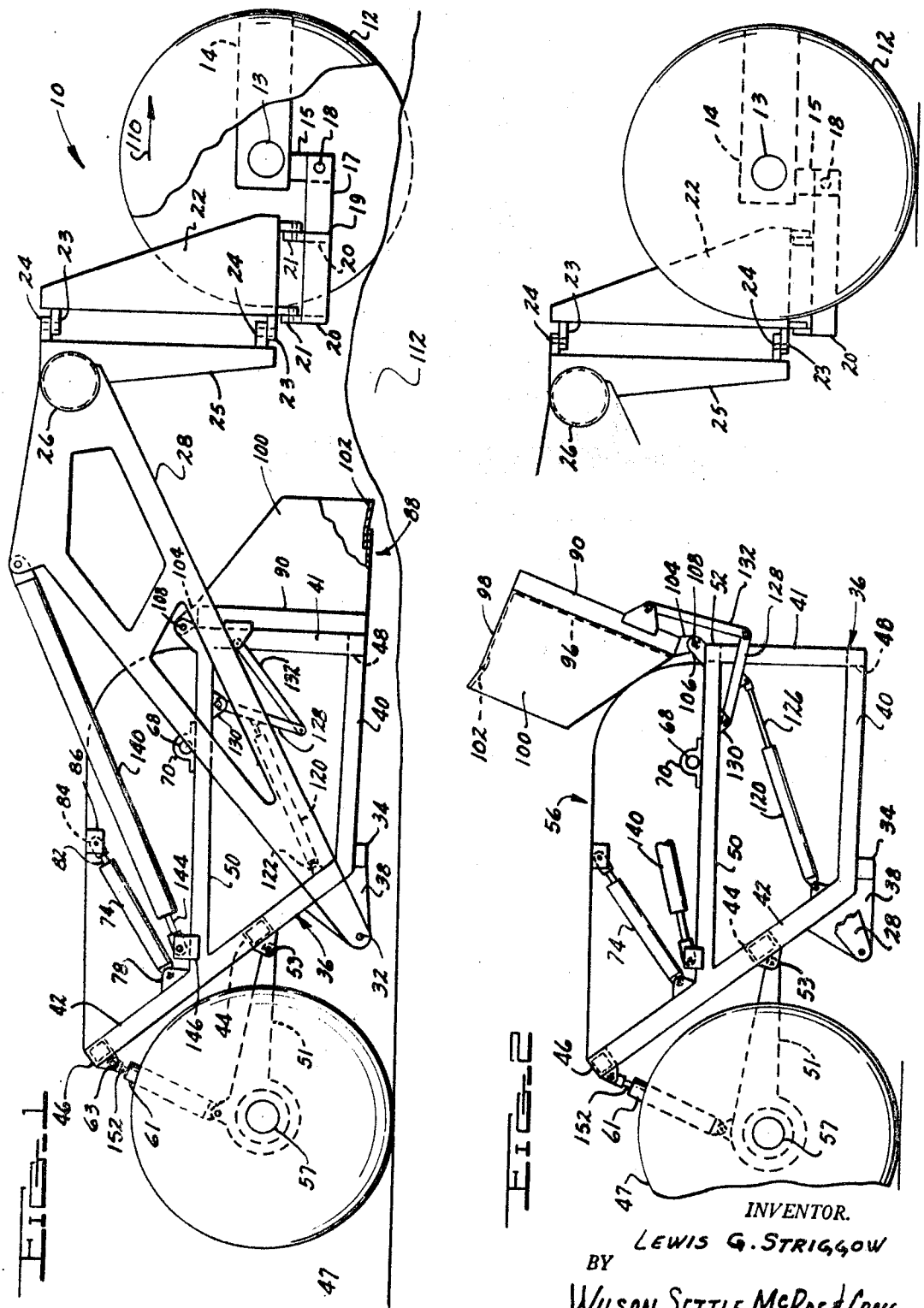

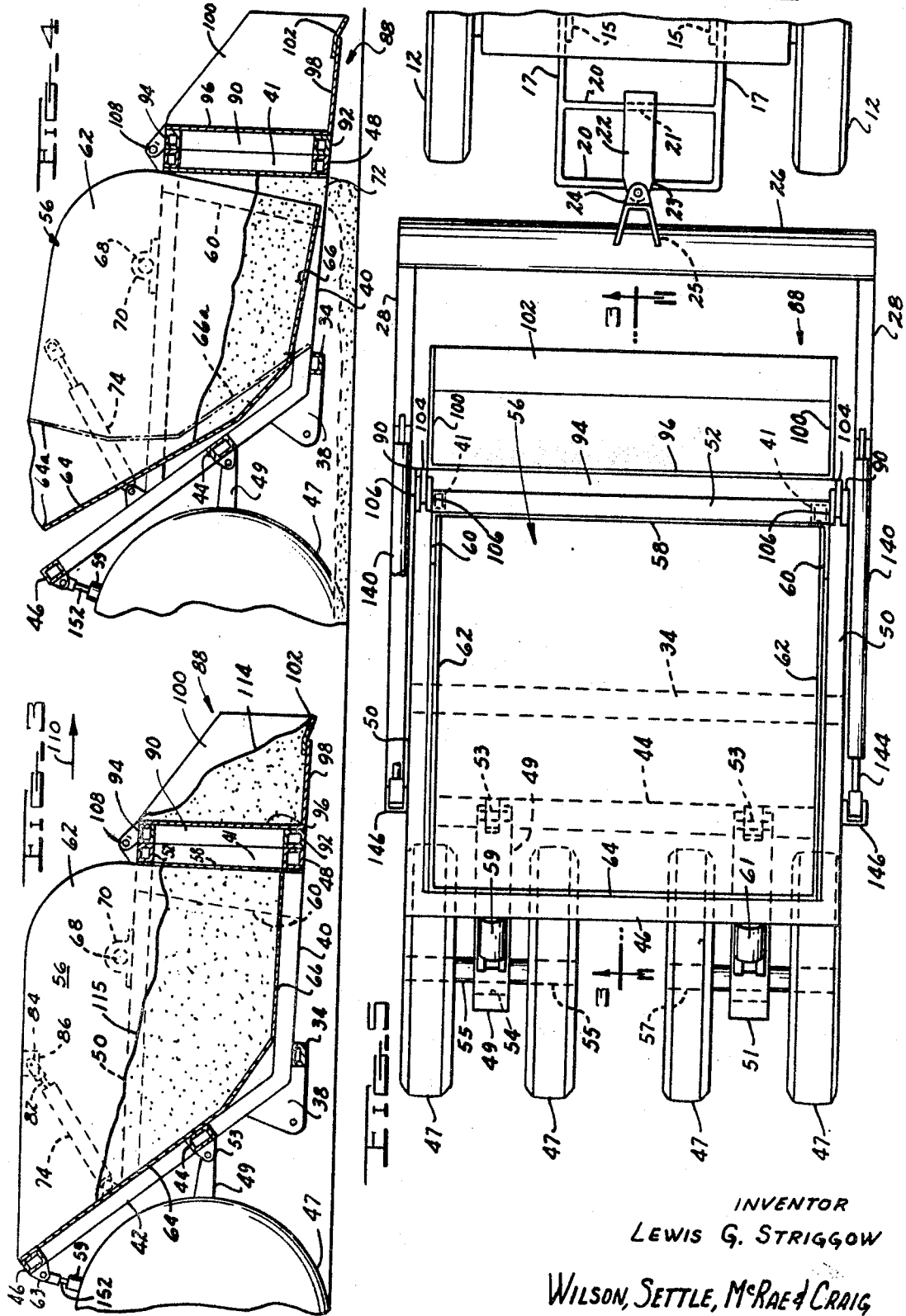

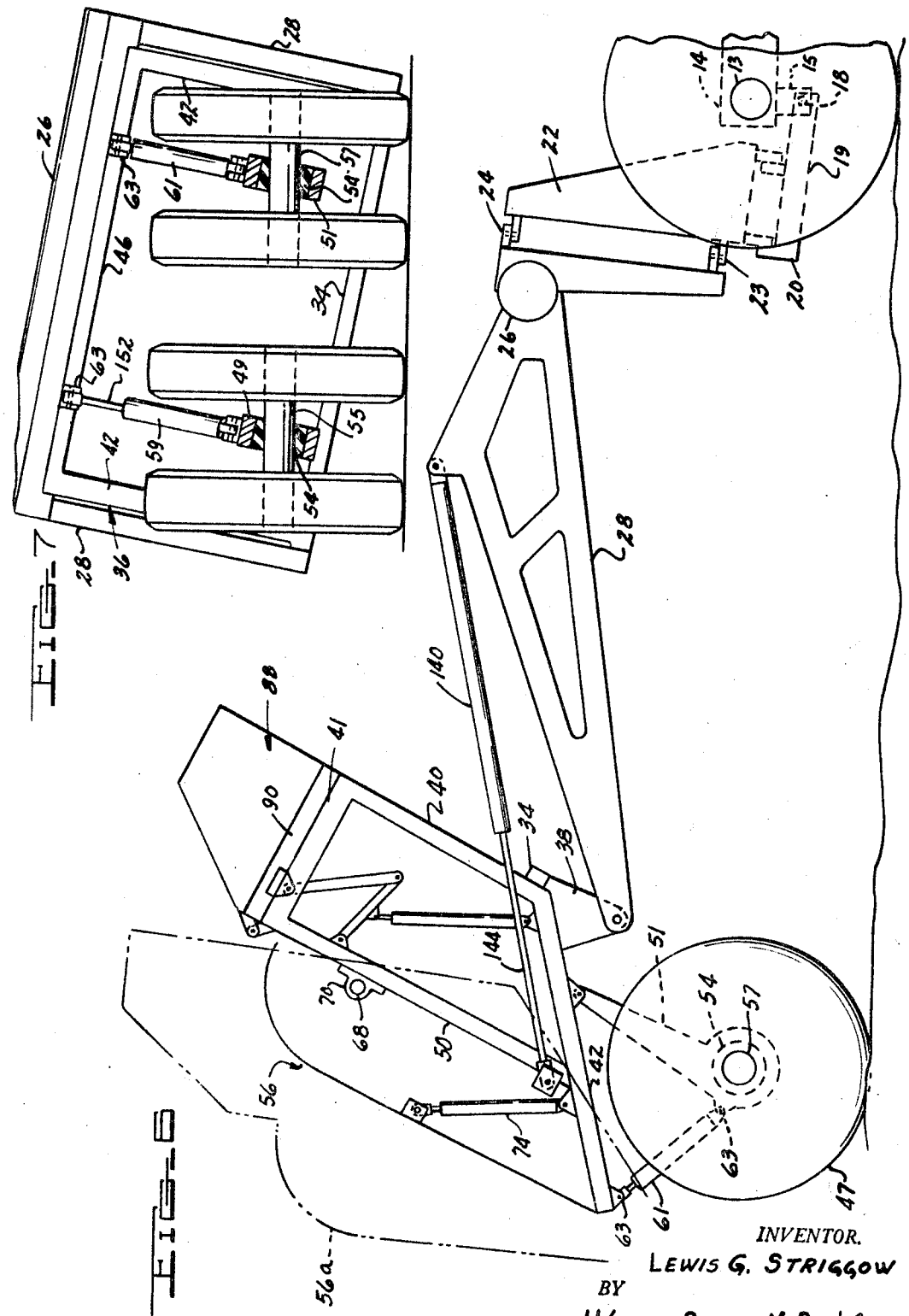

3,445,946
EARTH HANDLING EQUIPMENT HAVING
RECEPTACLE AND SHOVEL
Lewis G. Striggow, 1115 Marion Drive,
Holly, Mich. 48442
Filed Oct. 21, 1965, Ser. No. 505,601
Int. Cl. E02f 3/62
U.S. Cl. 37—126                    6 Claims

ABSTRACT OF THE DISCLOSURE

An earth handling apparatus which may be used for any of many functions including earth digging and loading, spreading, dumping, horizontal surface grading, slope surface contouring, and surface compacting. The apparatus includes an earth carrying receptacle pulled by a tractor and supported for upward swinging movement by a pair of arms connected to a hitch of the tractor. A first power means such as a piston-cylinder device controls the vertical position of the receptacle. A shovel is positioned in front of the receptacle to collect earth, and normally the earth flows back into the receptacle where it is carried and isolated from earth subsequently handled by the shovel. A second power means is operative to swing the shovel upwardly in an arc to overturn the same so that when heavy terrain is encountered the contents of the shovel can be dumped into the receptacle. The receptacle and shovel can be tilted by third power means when the apparatus is to be used for slope contouring. A bottom wall of the receptacle can be adjusted by still another power means to provide an opening from the receptacle for metered discharge of earth from the receptacle.

---

This invention relates to earth handling equipment, and particularly to equipment for performing such operations as earth breaking, shovelling, hauling, dumping, spreading, and/or grading. The equipment of this invention is so designed that certain of its operations can be performed on such materials as asphalt, rock, cement and materials other than loose soil or sand. The terms "earth" and "terrain" as used herein are intended to comprehend all such materials where applicable.

One embodiment of the invention comprises an implement having a puller vehicle or tractor, a set of rear wheels trailing behind said puller vehicle at a distance, and an articulated framework extending between the puller vehicle and trailing wheels. Cradled within the articulated framework is a receptacle-shovel assembly. The shovel is arranged forwardly of the receptacle so that as the vehicle is driven in a forward direction the blade portion of the shovel engages the earth and causes the collected earth to be received into the shovel and thence into the receptacle where it is carried and isolated from the earth subsequently being handled by the shovel.

The shovel is swingably mounted on a forward portion of the receptacle and is provided with an auxiliary power means for swinging same to an overturned position above the receptacle. By this arrangement, when particularly heavy terrain is encountered the auxiliary power means can be energized to swing the shovel through the terrain and deliver the collected earth into the receptacle.

In the embodiment under discussion the bite of the shovel into the earth is regulated by a novel fluid cylinder means operatively mounted between two portions of the aforementioned articulated frame. The frame portions are pivotally connected with one another is a generally V-shaped relationship with one of the frame portions being affixed to the earth receptacle. In operation, energization of the fluid cylinder means is effective to spread apart the opposed frame portions so as to raise the receptacle-shovel assembly. In this manner there is provided an accurate and easily regulated height control for the shovel. The fluid cylinder means is so arranged that on its continued energization the earth receptacle is swung upwardly and rearwardly with an overturning or dumping action. Thus the single fluid cylinder means serves both as a height regulator for the shovel and as an earth discharging means for the receptacle.

In the embodiment now under discussion a novel arrangement of mechanisms is provided to facilitate the regulated spreading of earth from the receptacle, as for example during the preparation of a road bed or the like where sand, gravel, stone or similar material is utilized. The spreading mechanism comprises a receptacle bottom wall mounted to move toward and away from the receptacle front wall, and power means for effecting and regulating such movement. By energizing the spreader power means in conjunction with the tractor power means the implement can be moved over the terrain and the receptacle bottom wall continually adjusted to the desired positions so that variable quantities of earth, sand, stone, gravel, etc. are discharged through the bottom wall-front wall space and thence onto the subjacent terrain as a layer of regulated thickness.

A further feature of interest is the use of the implement as a grader, particularly with regard to its ability to grade or create a sloping surface, as for example the sloping surface of a drainage ditch along the side of a roadway. The embodiment now under discussion employs a novel independent suspension of the right and left rear wheels and a novel arrangement of power cylinders cooperating therewith so that the implement may be tilted on a longitudinal horizontal axis. Thus, each of the right and left wheels is provided with a fluid cylinder means which when energized raises the corresponding side of the implement. By this arrangement the implement can be caused to tilt around its longitudinal axis so that the blade on the aforementioned shovel is pitched or inclined at an angle to the horizontal. In operation, as the vehicle proceeds along the terrain the pitched or inclined blade forms or grades a sloping surface on the terrain.

From the above discussion it will be seen that a primary object of the invention is to provide a multipurpose implement which accomplishes the multiple objectives of grading, slope contouring, digging, hauling, dumping and/or spreading.

Another object of the invention is to provide a multipurpose implement of the above type which may be constructed as a relatively low cost, lightweight vehicle.

A further object of the invention is to provide a multipurpose implement wherein all of the above-mentioned functions may be performed without extensive time required to convert the implements from one use to another use.

A further object of the invention is to provide a multipurpose implement which may be accurately controlled in each of its adjustments and movements.

Other objects of this invention will appear in the following description and appended claims, reference being had to the accompanying drawings forming a part of this specification wherein like reference characters designate corresponding parts in the several views.

In the drawings:

FIGURE 1 is a side elevational view of one embodiment of the invention;

FIGURE 2 is a side elevational view of the FIGURE 1 embodiment taken with a shovel thereof in a swung-up position for discharging its contents into an earth receptacle forming part of the embodiment;

FIGURE 3 is a fragmentary sectional view taken on line 3—3 of FIGURE 5;

FIGURE 4 is a fragmentary sectional view taken in the same direction as FIGURE 3, but with parts thereof moved to an adjusted position;

FIGURE 5 is a top plan view of the FIGURE 1 structure;

FIGURE 6 is a side elevational view of the FIGURE 1 embodiment taken with a receptacle-shovel assembly in the process of being moved to a dumping position, and FIGURE 7 is a rear end elevational view of the FIGURE 1 embodiment taken with the mechanisms thereof in a tilted condition suitable for producing and/or grading sloping surfaces.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown in FIGURE 1 an implement designated generally by the numeral 10, said implement including a conventional puller vehicle or tractor having a frame 14 and a set of rear floating wheels 12 mounted on axle means 13. In the illustrated embodiment the rear end portion of frame 14 is provided with two downwardly extending lugs 15 which overlap two forwardly extending arms 17 formed as part of a platform 19. Suitable pivot pins 18 are extended through the overlapping lugs to mount the platform for up-and-down pivotal movement on frame 14. The platform is provided with two cross members 20, each of which is provided with an upstanding lug 21 mating with a downwardly extending lug carried on the vertical frame element 22. Suitable pivot pins are extended through the lugs to mount element 22 for movement on platform 19 in a vertical arc transverse to the longitudinal axis of the implement. The rear upstanding surface of element 22 is equipped with lugs 23 which overlap lugs 24 carried on the gooseneck member 25. Suitable pivot pins are extended through the overlapping lugs 23 and 24 to mount the gooseneck for arcuate motion around a vertical axis. As will be seen from FIGURE 5 the gooseneck is affixed to a tubular crosshead 26 which extends laterally, from the center line of the implement in opposite directions with two generally rearwardly extending arms 28. These arms are of similar construction and the disposition thereof may best be seen from FIGURE 1. As there shown the arms extend from cross head 26 rearwardly and downwardly to a point 32 adjacent the cross member 34 which forms part of a unitary frame structure designated generally by numeral 36. Lugs 38 are carried by frame structure to pivotally connect arms 28 with the frame structure.

Frame structure 36 comprises two similar tubular frame members 40 of rectangular cross section extending forwardly from two rectangular cross sectioned tubular fame membes 42 which slope upwardly and rearwardly as shown in FIGURE 1. As best shown in FIGURE 3 the frame members 42 may be interconnected together by the two rectangularly cross sectioned tubular frame members 44 and 46. Similarly, the two frame members 40 may be interconnected together as by means of the laterally extending tubular cross members 34 and 48.

Frame structure 36 may further include two parallel generally horizontal frame members 50 which extend forwardly from intermediate portions of frame members 42 into connection with a laterally extending tubular rectangular cross sectioned frame member 52 (FIGURE 3). The frame structure may be completed by two tubular cross sectioned uprights 41 located to connect the forward ends of frame members 40 and 50. It is of course contemplated that additional reinforcement structures and frame work elements could be provided as found necessary to provide a sufficiently strong supporting frame work for the structure to be described herein after.

As shown in the illustrative drawings the frame structure is mounted forwardly of the four flotation wheels 47 (FIGURE 5), as by means of two independent arms 49 and 51. Each of the arms is movably connected at its forward end to the frame structure, as by means of hinge pin joints 53, and each of the arms is connected at its rear end with two of the rear wheels, as by having portions thereof encircle the wheel axles 55 and 57. As best seen in FIGURE 7 the openings in arms 49 and 51 are oversize with respect to the axle diameters so that resilient rubber-like flexible annular mounts 54 may be disposed in the defined annular spaces. It will be understood that the rubber-like elements 54 and encircling arms are retained against lateral axial movement on the axles, and that suitable bearings are provided between the axles and their wheels. Also suitable stabilizing means (not shown) may be provided between the arms and axles in order to prevent wheel shimmy.

Arms 49 and 51 are prevented from downward collapse by means of two fluid cylinders 59 and 61, each suitably trained between portions of frame structure 36 and respective ones of arms 49 and 51, as by conventional hinge pin joints 63. As will be seen from FIGURE 7 the arrangement of cylinders 59 and 61 is such that when selected ones of the cylinders are actuated framework 36 is tilted about the longitudinal axis of the implement, thereby conditioning the implement for slope forming and/or grading by blade 102 (FIGURE 3).

It will be seen from FIGURE 3 that frame structure 36 serves to mount an earth-containing receptacle indicated generally by the numeral 56. As shown in FIGURE 3 the receptacle includes a front wall 58 rigidly affixed to the two laterally extending frame elements 52 and 48. As will be seen from FIGURES 3 and 5 the front wall is provided with two rearwardly extending extensions 60. These extensions serve the general function of preventing undesired escape of earth through the sides of the receptacle when same is being utilized as an earth spreader device.

The receptacle comprises the two sidewalls 62, the sloping rear wall 64, and the generally horizontal bottom wall 66. As will be seen from a comparison of FIGURES 3 and 4 the side walls 62, rear wall 64 and bottom wall 66 are constructed as a unitary assembly separate from front wall 58. The assembly is provided with two axially aligned pivot pins 68 which extend laterally outwardly from the side walls 62 into pillow blocks 70 suitably secured to the frame elements 50. It will be seen that by this arrangement the assembly of side walls, bottom wall and rear wall can be pivotally moved or fulcrummed about the axis of pins 68 so as to move same between the FIGURE 3 and FIGURE 4 positions for earth-spreading purposes. Within the broader aspects of the invention it is contemplated that side walls 62 could be fixed relative to front wall 58, in which case suitable links would be utilized to suspend walls 64 and 66 for their shifting movements.

Referring again to the illustrated embodiment, in the FIGURE 3 position the assembly completely closes the lower portion of the receptacle so that it can serve as a container for earth. In positions between the FIGURE 3 position and the FIGURE 4 position the front edge of bottom wall 66 is located at a distance from the receptacle front wall 58 so as to define an opening 72 of a suitable dimension for discharging a regulated amount of earth, sand, gravel, or the like onto the sub-surface as the implement is being propelled along the terrain by the tractor. The dimension of the discharge opening may be varied in accordance with the material being handled and the desired thickness of the earth layer being deposited on sub-surface. It will however be understood that with certain materials the leading edge of wall 66 acts as a scraper device so that if the receptacle has relatively small clearance with respect to the sub-surface the edge of wall 66 slices through materials within opening 72 and in effect determines the thickness of the layer formed on the sub-surface. Preferably for this reason the leading ege of wall 66 is formed of hardened steel or other high wear resistant material.

To provide means for regulating the size of opening 72 there may be utilized a fluid cylinder means which comprises two cylinder-piston rod assemblies 74 located on either side of the receptatcle. As best shown in FIGURE 1 each fluid cylinder has a pivotal connection at 78 with a bracket carried on the frame member 42. The piston rod 82 for each fluid cylinder has a pivotal connection at 84 with a bracket 86 suitably secured to the respective receptacle sidewall 62. It will be seen from FIGURE 4 that by pumping fluid into the lower rear end of each cylinder 74 the receptacle sub-assembly can be tilted about the axis of pins 68 in a clockwise direction so as to enlarge the opening 72. If necessary in a particular situation the energization of cylinders 74 can be continued sufficiently to place the walls 64 and 66 in the phantom line conditions 64a and 66a (FIGURE 4) for quick discharge of the entire receptacle contents. By pumping fluid into the opposite ends of cylinders 74 the receptatcle sub-assembly can be returned in a counterclockwise direction to the FIGURE 3 closed position.

Referring further to FIGURE 3, there is provided a shovel 88 which includes two generally vertically extending tubular frame elements 90 and two generally horizontally extending frame elements 92 and 94. Attached thereto is a shovel rear wall 96, bottom wall 98 and the two side walls 100. The leading edge portion of the bottom wall 98 carries an earth-pierceable blade 102 for biting into the earth surface. If desired the shovel bottom and back walls could be constructed as a grill-like structure for enabling the shovel to shed fine soil from denser materials on its upstroke. Also the shovel could be provided with teeth on its leading edge, the choice depending on the character of the terrain on which the apparatus is being utilized. Generally when the apparatus is encountering rocky or chunk-like materials the tooth structure is preferred. Where light soil is encountered the blade type leading edge construction is preferred.

As will be seen from FIGURES 1 and 2, shovel 88 is provided with upwardly extending lugs 104, and frame structure 36 is provided with lugs 106. Pivot pins 108 are extended through the overlapping lugs so as to swingably mount shovel 88 for overturnment onto receptacle 56. FIGURES 1 and 2 show the shovel in its two positions of adjustment. Within the broader aspects of the invention the shovel could be rigid with the receptacle, although as will be seen hereinafter there is a definite advantage in making the shovel swingable as shown. When the illustrated shovel is in the FIGURE 1 position and the tractor is operated to draw implement 10 in the arrow 110 direction the blade 102 of wall 98 digs into the terrain 112 so that earth is gathered into the shovel. As the tractor continues its forward motion a quantity of material is accumulated in the shovel structure as shown best at 114 in FIGURE 3. Further forward movement of the vehicle causes the encountered earth to be thrown upwardly and rearwardly over the earth accumulations 114 and thence into receptacle 56 where it is collected, as at 115. The earth can accumulate in receptacle 56 without building up resistance to continued penetration of the blade into the earth. In this respect it will be seen that by the illustrated shovel-receptacle arrangement the earth accumulations in receptacle 56 are prevented from having any direct effect on the earth which is then being handled by blade 102. Thus, the earth accumulation 114 represents a relatively small mass, and its effect on the ability of the blade to penetrate through the earth is relatively small; in comparison if the entire mass of earth at 115 were unconfined there would be a considerable resistance to the continued depositing of earth in the receptacle. For example if the earth confining walls 58 and 96 were eliminated the entire mass of earth in the receptacle-shovel assembly would by its weight tend to gravitate onto the terrain out in front of the shovel structure. This action would result in an extreme resistance or back pressure to the piling up of additional dirt in the receptatcle, so that in many cases a relatively large horsepower vehicle structure and/or a relatively small earth capacity receptacle would be necessary. Conventionally as each ton of earth is put into the receptatcle it meets with ever increasing resistance from the earth, and with an illustrative twenty ton capacity receptacle the back pressure resistance is enormous. In many cases, the enormity of the resistance requires the use of two or more auxiliary treadlaying power units or pusher vehicles.

By disposing the shovel with a rear wall 96 and the receptacle with a front wall 58 as shown in the drawings the earth which is deposited into the receptacle is prevented from having any direct gravitational effect on the earth being handled by the blade 102. In this manner the receptacle portion can be constructed to have a relatively large earth capacity, and the implement can be moved through relatively heavy terrain without undue interference due to the aforementioned back pressure factor.

In the illustrated embodiment the earth-loading capacity is further enhanced by the fact that shovel 88 is formed as a swingable device. The swingable feature is utilized when extremely heavy terrain is encountered, and under such conditions the swingable shovel can be powered in an arc around the pivotal pins 108 so as to be driven with great force into the terrain. The action is such that the shovel breaks the earth up and away from the terrain.

In order to provide power for operating the shovel around pivot pins 108 there may be utilized a pair of cylinders, one of which is shown at 120 in FIGURE 1. It will be understood that a similar cylinder is provided on the hidden side of the receptacle.

Referring to FIGURES 1 and 2 each fluid cylinder 120 is provided with a pivotal connection 112 on the bracket 124, which is carried on the rearwardly sloping frame element 42. The piston rod 126 for each fluid cylinder is pivotally connected to a portion of a link 128. As best shown in FIGURE 1 the upper end of each link 128 is pivotally connected with a bracket 130 carried by the intermediate frame member 50, and the lower end of each link is pivotally connected with a second link 132 which extends upwardly to a pivotal connection with a bracket carried on a frame member 90 of the shovel. It will be seen that by the illustrated cylinder-linkage arrangement the introduction of pressure fluid into the lower rear ends of the fluid cylinders causes the linkages to be moved from the FIGURE 1 position to the FIGURE 2 position, thus swinging shovel 88 in a forward and upward arc so that the shovel contents are discharged into receptacle 56.

It will be understood that fluid cylinders 120 may be energized to the FIGURE 2 position when it is necessary to break up very heavy terrain, as for example very heavy clay-like soil, asphalt paving, or rock-like terrain. During such operation the tractor may be driven forwardly in the arrow 110 direction so as to provide a primary forward thrust on the shovel, and the cylinders 120 may be simultaneously energized to provide an auxiliary thrust on the shovel. Actually the thrust provided by cylinders 120 may in certain cases be of more importance than the thrust provided by the vehicle tractor since the cylinders 120 are required only to act on the relatively low mass of shovel structure 88, whereas the tractor horsepower is utilized against the entire mass of frame work 36, receptacle 56 and shovel structure 88. In any event the provision of the swingable shovel structure and the auxiliary power means 120 is in many cases very important in breaking up heavy terrain which would otherwise prove troublesome to the implement.

As previously noted, the position or depth of the shovel in the earth is preferably very accurately regulated so as to enable the implement to be operated in the most efficient manner, considering such factors as load on the equipment and character of the terrain. In the illustrated embodiment the control of the depth or cut of the shovel may be achieved by means of a pair of fluid cylinders 140 positioned on opposite sides of frame structure 36 (FIGURE 5). The piston rod portion 144 of each cylinder is pivotally connected to a bracket 146 carried on frame member 50, and the cylinder portion is pivotally connected to a portion of its arm 128, although (as is the case with each of the illustrated piston-cylinder assemblies) the piston and cylinder can be reversed end for end without affecting operability thereof. With the illustrated arrangement, the introduction of pressure fluid into right ends of the cylinders 140 causes the cylinders and piston rods to be extended from the FIGURE 1 position toward the FIGURE 6 position. As the piston rods extend from the cylinders the pivot points 32 are shifted upwardly by the movement of arms 28, and the entire receptacle-shovel assembly is achieved. By controlling the admission of fluid into the cylinders the height of blade 102 may be regulated as desired for best operation. It is contemplated that various fluid devices responsive to terrain contour and character can be utilized to regulate the operation of cylinders 140.

FIGURE 6 illustrates the position of parts after a partial extension of the piston rods 144 from their cylinders 140. Further extension of the piston rods from the FIGURE 6 piston places receptacle 56 in a fully tilted condition (phantom lines at 56a) for complete dumping of its contents through its open top. In this connection it will be seen that with the receptacle in the phantom line position there is a substantial rearwardly declining slope to walls 64 and 66 for permitting complete discharge of the earth. During the tilting movement there is an upward swinging motion of platform 19 about pivots 18 as well be seen from a comparison of FIGURES 1 and 6. Also, the rear wheels 47 are down forwardly by arms 28 so that the earth receptacle shifts slightly in a forward direction as the earth begins to discharge.

As thus for described the implement is suited for the muliple functions of digging, shoveling, earth-carrying, earth-spreading, and earth-dumping. It is contemplated that the implement can have a further function as a slope-former and/or grader. Thus, blade 102 can serve as a grading element under the control of cylinders 140 so as to smooth the terrain as the implement is propelled in the arrow 110 direction. In the FIGURE 1 position the implement is adapted to form or grade to a horizontal level. FIGURE 7 illustrates the implement in an adjusted condition whereby it can form or grade to a sloping or inclined contour. In order to adjust the implement into the FIGURE 7 position there are provided a pair of fluid cylinders 59 and 61. Each cylinder may be pivotally connected at its lower end with an arm 49 or 51 which is mounted on the axle 57 for two of the wheels 47. The piston rod 152 for each cylinder is pivotally connected with frame member 44. The two fluid cylinders are independently supplied with pressure fluid so that one cylinder may be extended while the other is retracted, and vise versa.

As shown in FIGURE 7 the right cylinder is in a retracted condition and the left cylinder is in an extended condition. In the illustrated position the left side portion of frame 36 is elevated relative to the right side portion so that the entire assembly of frame 36, receptacle 56, and shovel 88 is tilted as shown. The pivotal mounting at 21 (FIGURE 1) enables the assembly to undergo the tilting action without strain or parts breakage. By means of the tilting action the leading edge of blade 102 is tilted or inclined in a lateral direction. This inclined position is advantageous in that when the parts are thus disposed and the vehicle is moved in the arrow 110 direction the right end of the blade digs into the earth and removes same while the left end of the blade passes above the earth surface, as in the formation of a sloping surface.

By making several passes of the implement over an area it is possible to change a flat surface into a sloping surface. Such sloping surfaces are particularly desired in those areas along the sides of roads to form drainage ditches and/or prevent soil erosion. The implement may be used both as an earth remover for rough contouring and as a finishing tool for semismooth grading. The use of four wheels as shown at 47 is of advantage in that the weight of the implement can thereby be applied to the earth for compacting purposes to thereby prepare a more permanent erosion-free surface. Under conventional practice the earth removing and grading must be performed by separate implements. As previously indicated the illustrated implement performs these functions as well as various other functions.

In summary the implement shown in the drawings may be utilized for any one of several functions, including rock-dislodgement, earth digging and loading, spreading, dumping, horizontal surface grading, slope surface contouring, and surface compacting. The various functions may be performed under quick and accurate control by fluid cylinders arranged as shown in the drawings. Other suitable power devices such as electric cylinders could be employed to achieve satisfactory control.

It will be understood that the drawings are illustrative of the features of the invention and that in practice auxiliary bracing mechanisms, bearings, pressure lines, etc., would be utilized in conjunction with the illustrated components. The drawings show a particular embodiment of the invention, but it will be understood that variations therefrom may be resorted to without departing from the spirit of the invention as set forth in the appended claims.

I claim:

1. Earth handling apparatus comprising first and second spaced floatation mechanisms; a frame connected to said floatation mechanisms; an earth receptacle disposed within and supported by the frame between said floatation mechanisms; said earth receptacle including a forwardly declining rear wall having upper and lower portions and a generally horizontal bottom wall; first arm means extending between the first floatation mechanism and a point on the frame adjacent the juncture between the receptacle bottom wall and sloping rear wall; pivot means connecting said first arm means to said frame at said point; second arm means pivotally mounted upon and extending from the second flotation mechanism, means pivotally connecting said second arm means to the frame at a point on the sloping rear wall between said upper and lower portions to fulcrum the receptacle between loading and discharge positions; and power cylinder means trained between the frame and the first arm means so that expansive movement of the power cylinder means causes the receptacle to be lifted upwardly and rearwardly in an arc around the pivotal mounting of the second arm means on said second floatation mechanism such that the receptacle rear wall assumes a sloping rearwardly declining direction for discharge of the receptacle contents.

2. An elongated earth handling apparatus comprising floatation mechanism; an earth receptacle carried for swinging movement by said floatation mechanism and including a front wall, bottom wall and rear wall; a shovel disposed forwardly of said receptacle and pivotally connected therewith on a laterally extending axis disposed adjacent the upper edge of the receptacle front wall; said shovel including a rear wall disposed adjacent the receptacle front wall and a bottom wall disposed in general horizontal alignment with the bottom wall of the receptacle; a first power cylinder means between the receptacle and shovel for powering the shovel upwardly about its pivotal axis so as to cause said shovel to discharge its contents into the receptacle; second power cylinder means for tilting the receptacle-shovel assembly around the longitudinal axis of the apparatus so that as the apparatus traverses the earth the shovel is enabled to give the earth a sloping contour when measured in directions at right angles to the apparatus longitudinal axis; and third power cylinder means for swinging said receptacle-shovel assembly in an arc rearwardly and upwardly for discharging said receptacle.

3. The combination of claim 2 wherein the second power means comprises a power cylinder arranged between the floatation mechanism and receptacle in a location offset from the longitudinal axis of the apparatus so that energization of the power cylinder is effective to raise one side portion of the receptacle relative to the other side portion.

4. The combination of claim 2 and further comprising means for shifting the receptacle bottom wall away from the receptacle front wall to define a discharge opening usable for spreading earth from the receptacle onto the subsurface.

5. Earth handling apparatus comprising a puller tractor; a hitch structure located on a rear portion of said tractor; a crosshead having a universal connection with the hitch structure; two rearwardly and downwardly extending arms connected with the outboard portions of said crosshead; a framework located in the space between the arms rearwardly of the crosshead; said framework including a generally rearwardly and upwardly sloping rear frame portion, a lower generally horizontal frame portion, a vertical front frame portion extending upwardly from the lower frame portion, and side frame portions; horizontal pivot means interconnecting the framework with the aforementioned arms at a point adjacent the juncture between the lower frame portion and the sloping rear frame portion; first power cylinder means trained between the framework and the arms for thereby controlling the vertical position of the framework; wheel means rearwardly of the framework; second arm means extending from said wheel means to the rear upwardly sloping frame portion; second power cylinder means between said second arm means and the sloping rear frame portion for tilting the framework about a longitudinal axis; a receptacle cradled within the framework; said receptacle including a front wall affixed to the front frame portion, a pair of side walls extending along the side frame portion, a rear wall extending generally parallel with the upwardly sloping frame portion, and a bottom wall extending generally parallel with the lower frame portion; said side walls, rear wall and bottom wall being connected together for conjoint movement; means swingably mounting the rear wall, side wall and bottom wall on a horizontal axis located transverse to the side frame portions, whereby said assembly is enabled to be swung away from the receptacle front wall to provide a metering discharge opening of varying cross section; a shovel including a rear wall disposed adjacent the front wall of the receptacle, a bottom wall extending forwardly from the shovel rear wall, and two shovel side walls; laterally extending pivot means interconnecting the shovel with the receptacle at a point adjacent the upper front edge of the receptacle; third power cylinder means operatively positioned between the framework and the shovel for swinging same upwardly about its pivot means and thence overturning same so that the shovel can discharge collected earth into the receptacle.

6. Earth handling apparatus comprising a puller tractor; a hitch structure located on a rear portion of said tractor; a crosshead having a universal connection with the hitch structure; two rearwardly and downwardly extending arms connected with the outboard portions of said crosshead; a framework located in the space between the arms rearwardly of the crosshead; horizontal pivot means interconnecting the framework with the aforementioned arms; first power cylinder means connected between the framework and the arms for thereby controlling the vertical position of the framework; wheel means rearwardly of the framework; second arm means extending from said wheel means to the framework and connected thereto; second power cylinder means connected between said second arm means and said framework for tilting said framework about a longitudinal axis; a receptacle cradled within the framework; said receptacle including a front wall affixed to the framework; a pair of said walls, a rear wall, and a bottom wall, said side walls, rear wall and bottom wall being connected together for conjoint movement; means swingably mounting the rear wall, side wall and bottom wall on a horizontal axis transverse to the framework, whereby said wall assembly may be swung away from the receptacle front wall to provide a metering discharge opening of varying cross section; third power means connected to said wall assembly for controlling the position of said bottom wall, a shovel located adjacent the front wall of the receptacle; pivot means connecting the shovel with the receptacle at a point adjacent the upper front edge of the receptacle; and fourth power means operatively connected between the framework and the shovel for swinging the shovel upwardly in an arc to overturn the same so that the shovel can discharge collected earth into the receptacle.

References Cited
UNITED STATES PATENTS

| Re. 23,166 | 11/1849 | Owen | 37—4 XR |
|---|---|---|---|
| 631,096 | 5/1899 | Smith | 37—4 XR |
| 652,399 | 6/1900 | Miller | 37—4 XR |
| 1,285,058 | 11/1918 | Dages et al. | 37—4 XR |
| 1,307,568 | 6/1919 | Wenndorf | 37—4 |
| 2,008,190 | 7/1935 | Shippee | 37—4 |
| 2,025,285 | 12/1935 | Hunter et al. | 37—129 |
| 2,051,283 | 8/1936 | Auston | 37—129 XR |
| 2,052,182 | 8/1936 | Le Bleu | 37—127 XR |
| 2,064,023 | 12/1936 | Maloon | 37—126 |
| 2,110,186 | 3/1938 | Weimer | 37—126 |
| 2,243,831 | 6/1941 | Berner | 37—4 |
| 2,302,335 | 11/1942 | Low | 37—126 |
| 2,738,739 | 3/1956 | Dorey | 105—282 |
| 2,883,774 | 4/1959 | Clifford | 37—127 |
| 2,989,931 | 6/1961 | Joy | 105—282 |
| 2,994,976 | 8/1961 | Hancock | 37—8 XR |
| 3,123,381 | 3/1964 | Poore | 37—124 XR |
| 3,235,985 | 2/1966 | Lauster | 37—126 |
| 3,274,711 | 9/1966 | Johnson et al. | 37—8 XR |

EDGAR S. BURR, *Primary Examiner.*

U.S. Cl. X.R.

37—4

UNITED STATES PATENT OFFICE
CERTIFICATE OF CORRECTION

Patent No. 3,445,946                                                     May 27, 1969

Lewis G. Striggow

It is certified that error appears in the above identified patent and that said Letters Patent are hereby corrected as shown below:

Column 1, line 69, "is" should read -- in --. Column 2, line 54, "implements" should read -- implement --. Column 3, line 25, "floating" should read -- floatation --; line 59, "fame membes" should read -- frame members --. Column 5, line 4, "ege" should read -- edge --; line 10, "receptatcle" should read -- receptacle --; line 24, "receptatcle" should read -- receptacle --. Column 6, line 6, "receptatcle" should read -- receptacle --; line 10, "receptatcle" should read -- receptacle --; line 39, "112" should read -- 122 --. Column 7, line 21, "achieved" should read -- elevated --; line 30, "piston" should read -- position --; line 39, "down" should read -- drawn --; line 42, "for", first occurrence, should read -- far --; line 43, "muliple" should read -- multiple --.

Signed and sealed this 24th day of March 1970.

(SEAL)
Attest:

EDWARD M. FLETCHER, JR.                        WILLIAM E. SCHUYLER, JR.
Attesting Officer                               Commissioner of Patents